(12) United States Patent
Ryu et al.

(10) Patent No.: US 9,102,056 B2
(45) Date of Patent: Aug. 11, 2015

(54) CONTROL METHOD AND DEVICE FOR POSITION-BASED IMPEDANCE CONTROLLED INDUSTRIAL ROBOT

(71) Applicant: GWANGJU INSTITUTE OF SCIENCE AND TECHNOLOGY, Gwangju (KR)

(72) Inventors: Je Ha Ryu, Gwangju (KR); Sehun Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 16 days.

(21) Appl. No.: 14/143,968

(22) Filed: Dec. 30, 2013

(65) Prior Publication Data

US 2014/0379131 A1 Dec. 25, 2014

(30) Foreign Application Priority Data

Jun. 19, 2013 (KR) ........................ 10-2013-0070194

(51) Int. Cl.
  *G05B 15/00* (2006.01)
  *B25J 9/16* (2006.01)

(52) U.S. Cl.
  CPC .............. *B25J 9/1633* (2013.01); *Y10S 901/09* (2013.01)

(58) Field of Classification Search
  USPC .................................. 700/248, 250, 252, 260
  See application file for complete search history.

(56) References Cited

U.S. PATENT DOCUMENTS

| | | | |
|---|---|---|---|
| 4,676,002 A * | 6/1987 | Slocum | 33/1 MP |
| 6,317,653 B1 * | 11/2001 | Kamiya | 700/260 |
| 7,206,626 B2 * | 4/2007 | Quaid, III | 600/407 |
| 2004/0254771 A1 * | 12/2004 | Riener et al. | 703/7 |
| 2007/0120512 A1 * | 5/2007 | Albu-Schaffer et al. | 318/568.2 |
| 2009/0105880 A1 * | 4/2009 | Okazaki | 700/258 |
| 2009/0171505 A1 * | 7/2009 | Okazaki | 700/258 |
| 2012/0072025 A1 * | 3/2012 | Takagi et al. | 700/260 |
| 2014/0379131 A1 * | 12/2014 | Ryu et al. | 700/260 |

FOREIGN PATENT DOCUMENTS

KR 1020050101742 A 10/2005

* cited by examiner

*Primary Examiner* — Ian Jen
(74) *Attorney, Agent, or Firm* — Lowe Hauptman & Ham, LLP (57) ABSTRACT

The present invention relates to a control method and device for position-based impedance controlled industrial robot, and more particularly, a control method and device for position-based impedance controlled industrial robot able to improve contact stabilization with regard to an environment with a variety of stiffness.

According to a control method and device for position-based impedance controlled industrial robot in accordance with the present invention, a robust contact stabilization for a position-based impedance controlled industrial robot contacting and interacting with an uncertain actual environment may be guaranteed.

14 Claims, 6 Drawing Sheets

CONTROL METHOD AND DEVICE FOR POSITION-BASED IMPEDANCE CONTROLLED INDUSTRIAL ROBOT

CROSS REFERENCE TO RELATED APPLICATION

This application claims the benefit of Korean Patent Application No. 10-2013-0070194, filed on Jun. 19, 2013, which is hereby incorporated by reference in its entirety into this application.

BACKGROUND OF THE INVENTION

1. Technical Field

The present invention relates to a control method and device for position-based impedance controlled industrial robot, and more particularly, a control method and device for position-based impedance controlled industrial robot able to improve contact stabilization with regard to an environment with a variety of stiffness.

2. Description of the Related Art

Industrial robots have been widely used in process automation in accordance with industrial development.

These industrial robots require not only motion control but also force control for safe interaction between robots and environment (task target) when task is performed while in contact with an external environment.

During the last 30 years, numerous force control methods for a safe contact task for robots have been proposed. These force control methods can be classified mainly into impedance control methods and hybrid position/force control methods.

Hybrid position/force control methods are methods controlling each force and position separately, and having a disadvantage of requiring a switching algorithm.

Impedance control methods are methods with a goal for robots to have desired impedance and thereby interaction between robots and environment is performed, and having an advantage of requiring no switching algorithm.

Since commercial industrial robots generally include precise robust position controllers, a position-based impedance control (PBIC) with the advantage has been proposed.

But, the position-based impedance control cannot guarantee contact stability because environmental parameters may exceed a fixed range and may be altered in a variety of ways. To make up for this, advanced control theories such as adaptive control, robust control, etc. are being applied, but i) system complexities increase, and designing precise adaptive rules and actual implementation is difficult for adaptive control, ii) robust control considers mostly little uncertainties, whereas, environment can possess a variety of properties from soft to very strong, and efficiency in performance and cost decline when large uncertainties are considered.

Conventional energy-bounding algorithm guarantees robust stabilization for interaction with a virtual environment. The conventional energy-bounding algorithm possess two control parameters corresponding to an environmental change, but the performance is limited in that control parameters are considered as constants and possess problems in that no detailed design method for control parameters is provided.

SUMMARY OF THE INVENTION

Therefore, the present invention is provided in view of the above mentioned problems, and control method and device for position-based impedance controlled industrial robot using a basic principle for energy-bounding algorithm and guaranteeing a robust contact stability corresponding to actual environment where environmental stiffness change in a variety of ways is provided.

In accordance with an aspect of the present invention to achieve the technical problem, A control method for position-based impedance controlled industrial robot in accordance with a force control method for a robot system with a position controller comprising:
(a) setting a first parameter; (b) detecting a displacement (X=Xd) and a contact force (Fe) of a robot; (c) calculating a stiffness estimate value of an environment from the displacement (X=Xd) and the contact force (Fe) of the robot; (d) calculating a second control parameter from the first control parameter and the stiffness estimate value; (e) judging whether a position variation amount is 0; (f) calculating an operating force (Fd) of a robot if a position variation amount is 0; (g) calculating a bounding parameter if a position variation amount is not 0; (h) calculating a range of bounding parameter values satisfying a condition a robot system is passive using the first parameter and the second parameter, and calculating an operating force (Fd) of a robot according to the calculated range of bounding parameter values; (i) applying the calculated operating force (Fd) in an impedance controller; (j) calculating a position correction displacement (Xf) by the impedance controller; and (k) applying the calculated position correction displacement (Xf) to the position controller is provided.

The (a) further comprises, initializing the first control parameter to a nominal environmental stiffness value; gradually increasing the first control parameter when a stable contact is maintained while a contact experiment with a high stiffness environment is performed; gradually decreasing the first control parameter when an unstable contact is generated while a contact experiment with a high stiffness environment is performed; and setting a maximum value, which guarantees stability, to the first control parameter.

The (d) is where the second control parameter is calculated as a smaller value than the first control parameter and the stiffness estimate value.

The operating force (Fd) of a robot is calculated with the following control rule:

$$F_d[n] = F_d[n-1] + \beta[n]\Delta x_d[n]$$

Here, Fd[n] is an operating force of a robot, $\beta[n]$ is a bounding parameter, xd[n] is a displacement of a robot.

The bounding parameter is calculated with the following equation:

$$\beta[n] = \frac{F_e[n] - F_d[n-1]}{\Delta x_d[n]}$$

for $$\Delta x_d[n] \neq 0$$

Here, $\beta[n]$ is a bounding parameter, Fe[n] is an actual contact force of an environment measured from a force/torque sensor, Fd[n] is an operating force of a robot, xd[n] is a displacement of a robot.

The (h) modifies the bounding parameter to the maximum value when the bounding parameter is higher than a set maximum value, modifies the bounding parameter to the minimum value when the bounding parameter is lower than a set minimum value, and maintaining the value of the bounding parameter when the bounding parameter is between the minimum and the maximum value.

The range of the bounding parameter is determined by the following bounding rule:

$$\beta_{max}[n] = \min(c_1, \gamma_{max}[n]), \beta_{min}[n] = \gamma_{min}[n] \text{ and,}$$

$$\gamma_{max}[n] = c_2 - \frac{F_d[n-1]}{\Delta x_d[n]} + \sqrt{c_2^2 + \left(\frac{F_d[n-1]}{\Delta x_d[n]}\right)^2}$$

$$\gamma_{min}[n] = c_2 - \frac{F_d[n-1]}{\Delta x_d[n]} - \sqrt{c_2^2 + \left(\frac{F_d[n-1]}{\Delta x_d[n]}\right)^2}$$

Here, $\beta_{max}[n]$ is a maximum value of bounding parameter, $\beta_{min}[n]$ is a minimum value of a bounding parameter, $F_d[n]$ is an operating force of a robot, $x_d[n]$ is a displacement of a robot, $c_1$ is a first control parameter, $c_2$ is a second control parameter, $c_1$ and $c_2$ are positive values and $c_1 \geq c_2$.

The control method for position-based impedance controlled industrial robot further comprises, (l) judging whether the value of the bounding parameter exceeds a range satisfying a condition for passivity and is bounded to a maximum value or a minimum value (EBA bounding generated); and (m) calculating a new reference position (X0) when EBA bounding is generated and applying to the position controller.

Meanwhile, in accordance with an aspect of the present invention to achieve the technical problem, a control device for position-based impedance controlled industrial robot comprising, a sample/hold unit for performing input and output with a position-based impedance controlled industrial robot, and interconverting analog signals and digital signals; and a control unit receiving a physical parameter of the position-based impedance controlled industrial robot from the sample/hold unit, and calculating an operating force, which is to be transmitted to the position-based impedance controlled industrial robot, according to an interaction between the position-based impedance controlled industrial robot and an environment, and transmitting to the position-based impedance controlled industrial robot through the sample/hold unit is provided. The control unit calculates a bounding parameter for the position-based impedance controlled industrial robot according to the physical parameter, and calculates an operating force of the position-based impedance controlled industrial robot according to a range of a bounding parameter value, in which a robot system satisfies a passivity condition in the environment, and applies to an impedance controller, and applies the calculated position compensation displacement, which is calculated by the impedance controller, to a position controller.

The operating force (Fd) of a robot is calculated with the following control rule:

$$F_d[n] = F_d[n-1] + \beta[n]\Delta x_d[n]$$

Here, $F_d[n]$ is an operating force of a robot, $\beta[n]$ is a bounding parameter, $x_d[n]$ is a displacement of a robot.

The bounding parameter is calculated with the following equation:

$$\beta[n] = \frac{F_e[n] - F_d[n-1]}{\Delta x_d[n]}$$

for $$\Delta x_d[n] \neq 0$$

Here, $\beta[n]$ is a bounding parameter, $F_e[n]$ is an actual contact force of an environment measured from a force/torque sensor, $F_d[n]$ is an operating force of a robot, $x_d[n]$ is a displacement of a robot.

The control unit modifies the bounding parameter to the maximum value when the bounding parameter is higher than a set maximum value, modifies the bounding parameter to the minimum value when the bounding parameter is lower than a set minimum value, and maintaining the value of the bounding parameter when the bounding parameter is between the minimum and the maximum value.

The range of the bounding parameter is determined by the following bounding rule:

$$\beta_{max}[n] = \min(c_1, \gamma_{max}[n]), \beta_{min}[n] = \gamma_{min}[n],$$

and, $$\gamma_{max}[n] = c_2 - \frac{F_d[n-1]}{\Delta x_d[n]} + \sqrt{c_2^2 + \left(\frac{F_d[n-1]}{\Delta x_d[n]}\right)^2}$$

$$\gamma_{min}[n] = c_2 - \frac{F_d[n-1]}{\Delta x_d[n]} - \sqrt{c_2^2 + \left(\frac{F_d[n-1]}{\Delta x_d[n]}\right)^2}.$$

Here, $\beta_{max}[n]$ is a maximum value of a bounding parameter, $\beta_{min}[n]$ is a minimum value of a bounding parameter, $F_d[n]$ is an operating force of a robot, $x_d[n]$ is a displacement of a robot, $c_1$ is a first control parameter, $c_2$ is a second control parameter, $c_1$ and $c_2$ are positive values and $c_1 \geq c_2$.

The control unit judges whether the bounding parameter value exceeds a range satisfying a condition for passivity and is bounded to a maximum value or a minimum value (EBA bounding generated), and calculates a new reference position (X0) when EBA bounding is generated and applies to the position controller.

According to a control method and device for position-based impedance controlled industrial robot in accordance with the present invention, a robust contact stabilization for a position-based impedance controlled industrial robot contacting and interacting with an uncertain actual environment may be guaranteed.

Also, a deteriorated performance of a position-based impedance controlled industrial robot, in which stability is guaranteed, may be improved through a stabilize first and improve performance next strategy.

DESCRIPTION OF THE EXEMPLARY EMBODIMENTS

Hereinafter, exemplary embodiments of the present invention will now be described in detail with reference to the accompanying drawings. First, with regard to applying reference codes to components of each drawing, it should be noted that same codes are applied, if possible, to same components even if they are illustrated in other drawings. Also, although some exemplary embodiments have been described herein, it should be understood by those skilled in the art that these embodiments are given by way of illustration only, and that various modifications, variations and alterations can be made without departing from the scope of the invention.

Figure 1:
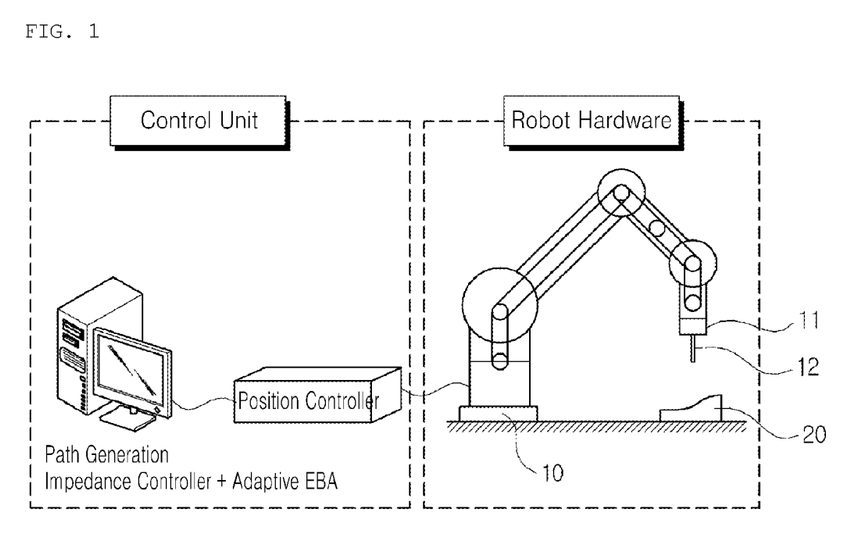
FIG. 1 is a view showing an overall system diagram of a position control industrial robot according to an embodiment of the present invention.
Figure 2:
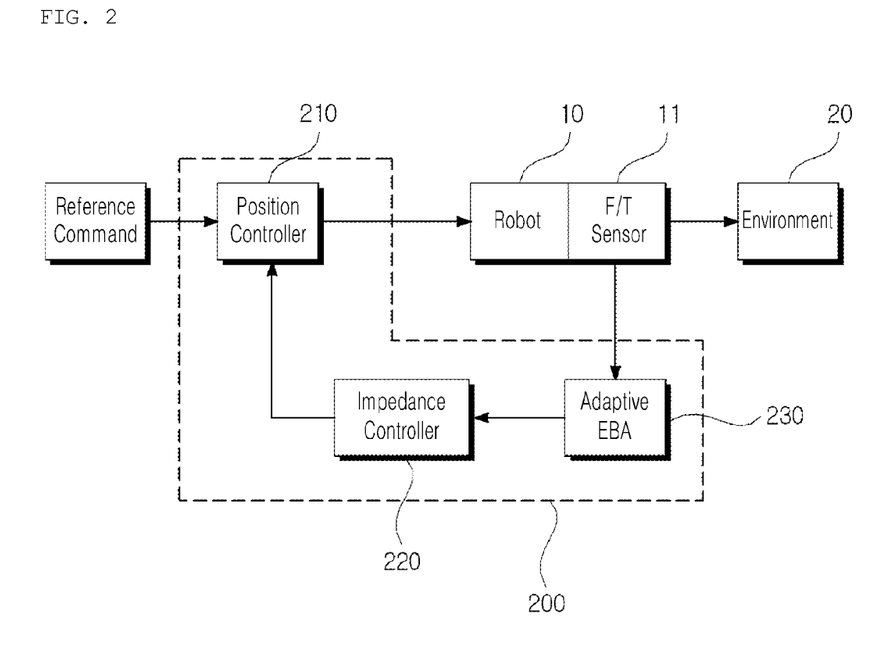
FIG. 2 is a view showing a conceptual diagram of FIG. 1.

FIG. 1 is a view showing an overall system diagram of a position control industrial robot according to an embodiment of the present invention, and FIG. 2 is a view showing a conceptual diagram of FIG. 1.

Referring to FIGS. 1 and 2, a robot system according to an embodiment of the present invention includes a position controller 210, a control unit including an impedance controller 220 and an adaptive EBA controller 230, a robot including a force/torque sensor (F/T sensor) and an end-effector, and an environment interacting with a robot.

All of the controllers of a control unit are mostly realized with a computer, but a position controller 210 unique to a robot may exist separately.

A control unit 200 according to an embodiment, performs adaptive Energy Bounding Algorithm (EBA) control to perform robust stability and force control for a position-based impedance controlled industrial robot 10 when interacting with an environment 20 including uncertainty.

Control rules for adaptive EBA is as follows, $$F_d[n] = F_d[n-1] + \beta[n]\Delta x_d[n] \quad \text{[Equation 1]}$$

Here, Fd[n] is an operating force of a robot, $\beta[n]$ is a bounding parameter, xd[n] is a displacement of a robot.

$$\beta[n] = \frac{F_e[n] - F_d[n-1]}{\Delta x_d[n]} \quad \text{[Equation 2]}$$

for $$\Delta x_d[n] \neq 0$$

Here, $\beta[n]$ is a bounding parameter, Fe[n] is an actual contact force of an environment measured from a force/torque sensor, Fd[n] is an operating force of a robot, xd[n] is a displacement of a robot.

Equation 1 is designed to take the form of a difference recursive equation for real-time calculation.

An embodiment of the present invention provides a method to design a first parameter c1 and a second parameter c2 of an adaptive EBA for robust stability and desired performance.

A first control parameter c1 of an adaptive EBA is designed as follows.

$$\beta[n] \leq c_1 = B_t/T \text{ for } \forall n \geq 0 \quad \text{[Equation 3]}$$

Here, $\beta[n]$ is a bounding parameter, c1 is a first control parameter, Bt is a target damping value, T is period.

A first control parameter c1 of an adaptive EBA having close relationship with a target damping value $B_t$ and a sampling period T may be identified from equation 3.

Especially, because a first control parameter c1 has close relationship with energy consumption competency of a robot system, it is a parameter involved in the stability of an entire system.

A big difference between the present invention and the conventional haptic EBA is that $B_t$ of equation 3 signifies not a physical damping value but an artificial damping value designed by an impedance controller 220.

But, the artificial damping value may not precisely show an actual energy consumption competency of an impedance controlled robot due to imperfect dynamic cancelling of an improved impedance control, unmodeled dynamic effect such as friction, etc.

The present invention provides a simpler and more practical method to design a first control parameter c1 as a solution to the difficulty of designing an adaptive EBA control parameter according to the actual situation.

First, after setting a first control parameter c1 as an initial value with a nominal stiffness value of an environment 20 taken into consideration when impedance controller 220 is designed, a simple contact experiment with an impedance controlled robot combined with an adaptive EBA with an environment 20 with high stiffness is performed. When an initial value of first control parameter c1 guarantees stable contact, contact experiment is repeated by gradually increasing a first control parameter value c1 until contact instability is generated. In an opposite situation, contact experiment is repeated by gradually decreasing a first control parameter value c1 until contact instability is not generated. A maximum value of a first control parameter c1 guaranteeing stability is found and applied through this process.

Because a robot system using a fixed impedance controller 220 has a constant damping value, and a first control parameter c1 has relationships with only maximum energy consumption competency of an impedance controlled robot, the first control parameter, designed with the method described above, may be used for interaction with an environment 20 with a variety of stiffness.

A second control parameter c2 of an adaptive EBA in the present invention is designed to have the following condition.

$$c_2 \leq K_e \quad \text{[Equation 4]}$$

Here, c2 is a second control parameter, Ke is an estimated stiffness value of an environment.

When a second control parameter c2 is designed with stiffness $K_e$, which is a upper bound value, of an environment 20, the second control parameter c2 may be considered as an estimated value of a stiffness of an environment 20.

Because not only a second control parameter c2 should be smaller or equal to a first control parameter for a bounding parameter satisfying a passivity condition for an entire system to exist, but also should have a relationship of $c_2 \leq K_e$ According to equation 4 with regard to a static spring environment, lastly, a second control parameter c2 may be designed as the following equation.

$$c_2 \leq \min(c_1, K_e) \quad \text{[Equation 5]}$$

Here, c1 is a first control parameter, c2 is a second control parameter, Ke is an estimated value of stiffness of an environment.

Hereinafter, a derivation process of the described adaptive EBA is described.

Figure 3:
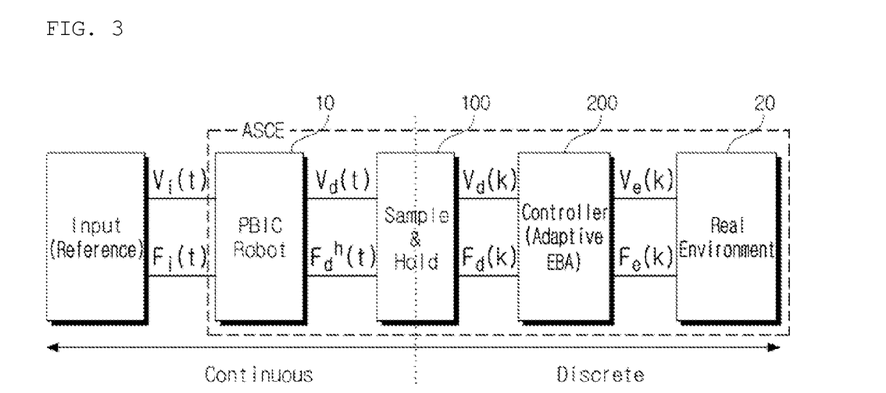
FIG. 3 is an overall system network view of diagram of FIG. 1.

FIG. 3 is an overall network view of diagram of FIG. 1.

Referring to FIG. 3, a control device of a position-based impedance controlled industrial robot in accordance with an embodiment of the present invention includes a sample/hold unit 100 for performing input and output with a position-based impedance controlled industrial robot 10 and interconverting analog signals and digital signals, and a control unit 200 receiving a physical parameter from a position-based impedance controlled industrial robot 10 from a sample/hold unit 100 and calculating an operating force, which is to be transmitted to a position-based impedance controlled industrial robot 10, according to an interaction between a position-based impedance controlled industrial robot 10 and an environment 20, and transmitting to a position-based impedance controlled industrial robot 10 through a sample/hold unit 100.

A control unit 200 calculates a bounding parameter for a position-based impedance controlled industrial robot 10 according to a physical parameter, and calculates an operating force of a position-based impedance controlled industrial robot 10 according to a range of bounding parameter values a robot system satisfies a passivity condition in an environment 20 and applies to a impedance controller 220, and applies the calculated position compensation displacement, which is calculated by an impedance controller 220, to a position controller 210.

For a position-based impedance controlled industrial robot 10 to interact stably with an environment 20, a passivity condition should be satisfied.

Referring to a network in FIG. 3, A shows a position-based impedance controlled industrial robot 10, S shows a sample/hold unit 100, C shows a control unit 200, and E shows an environment 20. Distinguishing passivity of a system in a network in FIG. 3 may be illustrated by the following equation.

$$\int_0^t F_i(\tau)v_i(\tau)d\tau \geq V_{ASCE}(t) - V_{ASCE}(0), \text{ for } \forall t \geq 0 \quad [\text{Equation 6}]$$

Here, Fi is input force, vi is input velocity, V(.) is energy stored in a network.

Since energy added is equal to the sum of energy stored and energy consumed according to the law of conservation of energy, equation 6 shows energy added (front-end of equation 6) is greater than or equal to energy stored (back-end of equation 6) in a network. That is, when each component of a network satisfies a passivity condition, energy stored should be lesser than or equal to energy supplied according to the law of conservation of energy.

The passivity condition of equation 6 may be reorganized into the following equation 7.

$$E_A[n] + \sum_{k=0}^{n-1} F_d[k]\Delta x_d[k+1] \geq V_{ASCE}[n] - V_{ASCE}[0] \quad [\text{Equation 7}]$$

In equation 7, EA expresses energy supplied to a position-based impedance controlled industrial robot 10, and may be expressed as $E_A[n] = \int_0^{nT}\{F_i(t)v_i(t) - F_d^h(t)v_d(t)\}dt$, and the second term in the left side of equation 7 expresses energy supplied to an SCE component and may be derived as the following equation.

$$E_{SCE}[n] = \int_0^{nT} F_d^h(t)v_d(t)dt$$

$$= \sum_{k=0}^{n-1} F_d[k](x_d[k+1] - x_d[k])$$

Equation 7 may be reorganized into equation 8 with regard to a position-based impedance controlled industrial robot 10.

$$\frac{B_t}{T}\sum_{k=0}^{n-1}\Delta x_d^2[k+1] + \sum_{k=0}^{n-1}(F_d[k] - F_d[k+1])\Delta x_d[k+1] + \quad [\text{Equation 8}]$$

-continued $$\sum_{k=0}^{n-1} F_d[k+1]\Delta x_d[k+1] \geq V_{CE}[n] - V_{CE}[0]$$

Derivation process of equation 8 is as follows.

Figure 4:
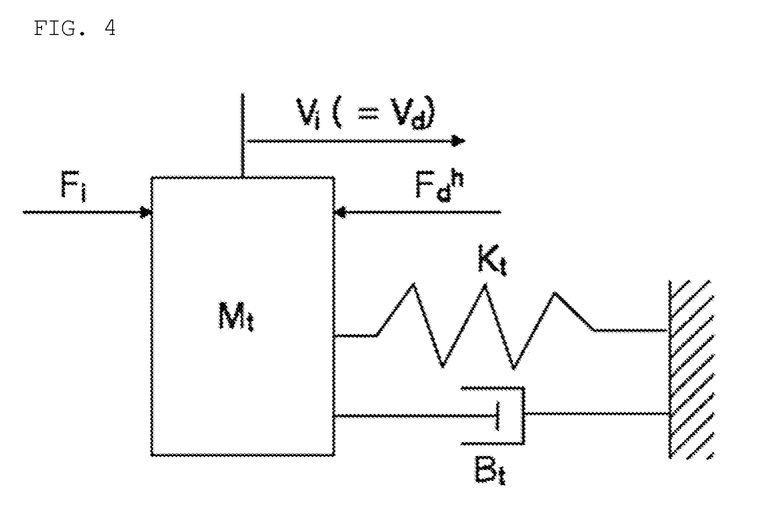
FIG. 4 is a view showing a first degree of freedom model of a position-based impedance controlled industrial robot.

FIG. 4 is a view showing a first degree of freedom model of a position-based impedance controlled industrial robot 10.

When position-based impedance controlled industrial robot 10 is expressed as a model having a first degree of freedom such as in FIG. 4, the law of dynamics of a position-based impedance controlled industrial robot may be expressed as $$F_i(t) = M_t\dot{v}_i(t) + B_tv_i(t) + K_tx_i(t) + F_d^h(t), v_i(t) = v_d(t)$$

When the law of dynamics of a position-based impedance controlled industrial robot with a first degree of freedom is substituted to equation $$E_A[n] = \int_0^{nT}\{F_i(t)v_i(t) - F_d^h(t)v_d(t)\}dt,$$

the equation may be derived as $$E_A[n] = V_A[n] - V_A[0] + \int_0^{nT} B_tv_d^2(t)dt.$$

Here, $V_A[n] = M_tv_d^2[n]/2 + K_tx_d^2[n]/2$, and the third term in the right side of the equation expresses energy consumed in a position-based impedance controlled industrial robot.

When this is applied to equation 6 of passivity condition, may be derived as $\int_0^{nT} B_tv_d^2(t)dt + \sum_{k=0}^{n-1} F_d[k]\Delta x_d[k+1]$. Here, since energy stored in a sample/hold unit 100 is 0, $V_{ASCE} = V_A + V_{CE}$ is used.

Next, when Cauchy-Schwarz $$\left(\int_0^{nT} B_tv_d^2(t)dt \geq \frac{B_t}{T}\sum_{k=0}^{n-1}\Delta x_d^2[k+1]\right)$$

is used and organized, equation 8 may be obtained.

When equation 8 is separated into two inequalities, it becomes first condition and second condition of passivity condition. The first passivity condition is expressed as the following equation 9, and the second passivity condition is expressed as the following equation 10.

$$\frac{B_t}{T}\sum_{k=0}^{n-1}\Delta x_d^2[k+1] + \sum_{k=0}^{n-1}(F_d[k] - F_d[k+1])\Delta x_d[k+1] \geq 0 \quad [\text{Equation 9}]$$

$$\sum_{k=0}^{n-1} F_d[k+1]\Delta x_d[k+1] \geq V_{CE}[n] - V_{CE}[0] \quad [\text{Equation 10}]$$

Equations 9 and 10 are sufficient conditions satisfying equation 8, which is a passivity condition.

According to an embodiment of the present invention, a control rule for satisfying first passivity condition equation and second passivity condition equation is designed with equation 1 and equation 2.

Bounding parameter in equations 1 and 2 expresses controllable stiffness value, and range of a bounding parameter satisfying equations 9 and 10, which are passivity condition equations, is bounded as the following.

A bounding parameter is modified to a maximum value when a bounding parameter is higher than a set maximum value, modified to a minimum value when a bounding parameter is lower than a set minimum value and a value of a bounding parameter is maintained when a bounding parameter is between minimum and maximum values.

The maximum value of a bounding parameter is $\beta_{max}[n]=\min(c_1, \gamma_{max}[n])$, and minimum value is $\beta_{min}[n]=\gamma_{min}[n]$, and $$\gamma_{max}[n] = c_2 - \frac{F_d[n-1]}{\Delta x_d[n]} + \sqrt{c_2^2 + \left(\frac{F_d[n-1]}{\Delta x_d[n]}\right)^2} \quad \text{[Equation 11]}$$

$$\gamma_{min}[n] = c_2 - \frac{F_d[n-1]}{\Delta x_d[n]} - \sqrt{c_2^2 + \left(\frac{F_d[n-1]}{\Delta x_d[n]}\right)^2} \quad \text{[Equation 12]}$$

Here, Fd[n] is an operating force of a robot, xd[n] is a displacement of a robot, c1 is a first control parameter, c2 is a second control parameter and c1 and c2 are positive values and $c_1 \geq c_2$.

A first control parameter c1 is designed like equation 3 so that equation 1, which is a control rule, satisfies a first condition equation (equation 9), and is proved as the following.

According to equation 1, a first passivity condition equation (equation 9) may be expressed as $\Sigma_{k=0}^{n-1}(B_t/T-\beta[k+1]) \Delta x_d^2[k+1] \geq 0$, therefore, when $$c_1 \equiv \frac{B_t}{T} \geq \beta[k+1]$$

for all k values, equation is satisfied. A first control parameter (c1) has the same dimension as that of stiffness.

Meanwhile, a second passivity condition equation (equation 10) is satisfied when the following equation 11 is true.

$$F_d[n]\Delta x_d[n] \geq \frac{1}{2c_2}(F_d^2[n] - F_d^2[n-1]) \quad \text{[Equation 13]}$$

The proof is as the following.

When a second passivity condition equation (equation 10) is substituted to the left side of equation 11, equation becomes $$\sum_{k=0}^{n-1} F_d[k+1]\Delta x_d[k+1] \geq \frac{1}{2c_2}\sum_{k=0}^{n-1}(F_d^2[k+1] - F_d^2[k]) =$$

$$\frac{1}{2c_2}(F_d^2[n] - F_d^2[0]),$$

therefore, when $$\frac{1}{2c_2}(F_d^2[n] - F_d^2[0]) \geq V_{CE}[n] - V_{CE}[0],$$

a second passivity condition equation (equation 10) is satisfied.

When $F_d[0]=0$ and $V_{CE}[0]=0$ is assumed, and when a second control parameter c2 is selected in a range within $$c_2 \leq \frac{1}{2}\frac{F_d^2[n]}{V_{CE}[n]},$$

a second passivity condition equation (equation 10) is satisfied.

Energy $V_{CE}[n]$ $(=\Sigma_{k=0}^{n}F_e[k]x_d[k])$, which is stored in a control unit 200 and an environment 20, may be obtained from measured force ($F_e$) and penetration depth ($x_d$).

When an environment 20 is assumed to be a static spring environment, which is the worst in terms of stability, equation becomes $$V_{CE}[n] = \frac{1}{2}K_e x_d^2[n],$$

and when $$c_2 \leq \frac{1}{2}\frac{F_d^2[n]}{V_{CE}[n]}$$

is substituted, equation becomes $c_2 \leq K_e$ (equation 4).

Equation 13 becomes true when a bounding parameter is as the following.

$$\gamma_{max}[n] \geq \beta[n] \geq \gamma_{min}[n] \quad \text{[Equation 14]}$$

When bounding parameter is in the same range as equation 14, a second passivity condition equation (equation 10) is satisfied.

The proof regarding this, when equation 1 is substituted to 13, equation becomes $$\{F_d[n-1] + \beta[n]\Delta x_d[n]\}\Delta x_d[n] \geq$$

$$\frac{1}{2c_2}(\{F_d[n-1] + \beta[n]\Delta x_d[n]\}^2 - F_d^2[n-1]),$$

and when rearranged, solution of $(\beta[n]-\gamma_{max}[n])(\beta[n]-\gamma_{min}[n]) \leq 0$ may be recognized.

Here, $\gamma_{max}[n]$ and $\gamma_{min}[n]$ is defined in equations 11 and 12.

As a result, since a range of a bounding parameter satisfying a passivity condition satisfies both equation 14 and equation 3, it may be expressed as equation 15.

$$\min(c_1, \gamma_{max}[n]) \geq \beta[n] \geq \gamma_{min}[n] \quad \text{[Equation 15]}$$

Here, $c_1 \geq c_2$.

Second control parameter c2 in equations 11 and 12 is always a value between $\gamma_{max}[n]$ and $\gamma_{min}[n]$, therefore, when a first control parameter c1 is on position ① in the horizontal line below, a bounding parameter value satisfying both first passivity condition equation and second passivity condition equation does not exist. Therefore, when a second control parameter c2 with a value of $c_1 \geq c_2$ is selected, first control parameter (c1) is always greater than $\gamma_{min}[n]$, therefore, a bounding parameter value satisfying both first passivity condition equation and second passivity condition equation may exist.

Therefore, the range of a second control parameter c2 has the same range of $c_2 \leq \min(c_1, K_e)$ of equation 5.

When a performance aspect of a robot system with the described adaptive EBA applied is analyzed, when a first control parameter c1 is greater than a stiffness value of an environment 20 ($.c_1 \geq K_e \geq c_2$), a second control parameter c2 may be set to be a stiffness value of an environment 20, therefore, a position-based impedance controlled industrial robot 10 has more than enough of energy consumption competency and therefore a designed contact force may be sufficiently maintained.

On the contrary, when a first control parameter c1 is lesser than a stiffness value of an environment 20 ($.c_2 \le c_1 \le K_e$), since a second control parameter c2 should be set to a first control parameter c1, contact force is bounded according to a bounded stiffness value c1.

Figure 7:
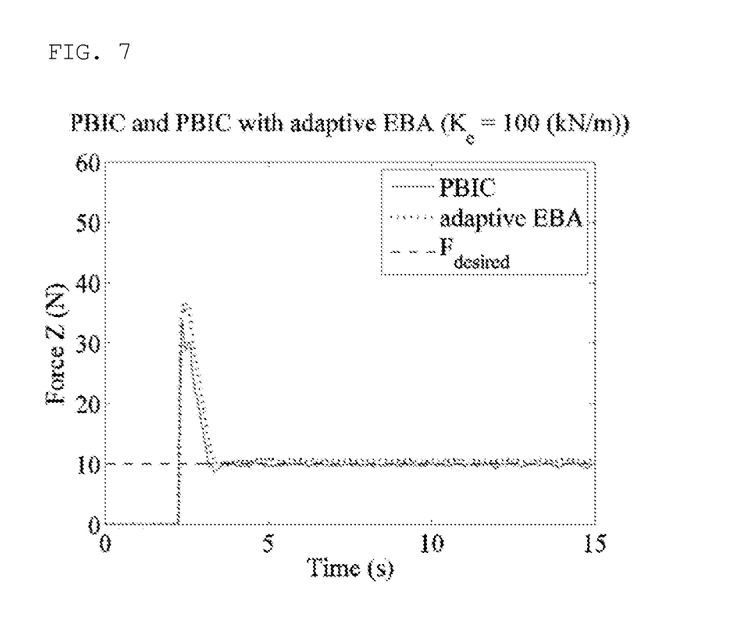
FIG. 7 is a graph showing a contact force of a position-based impedance controlled industrial robot in a nominal environment.
Figure 8:
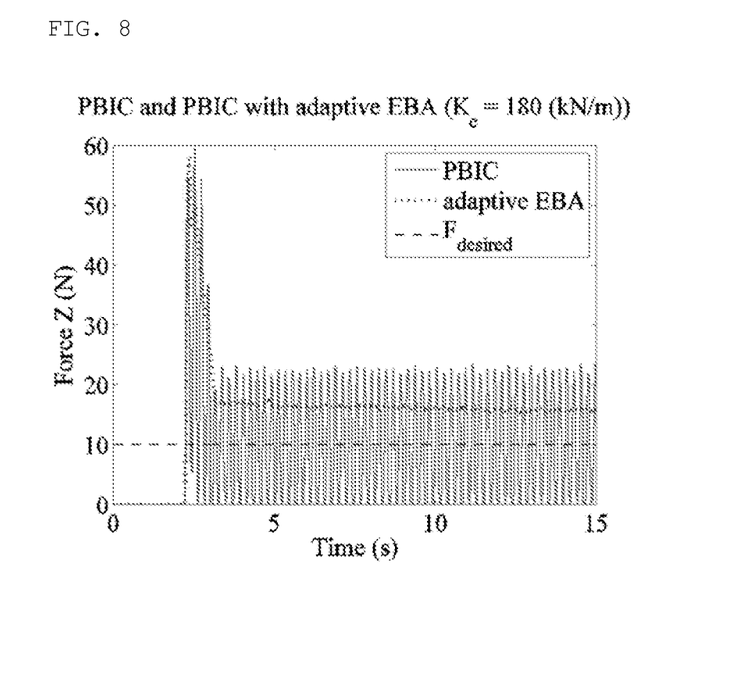
FIG. 8 is a graph showing a contact force of a position-based impedance controlled industrial robot in a stiff environment.
Figure 9:
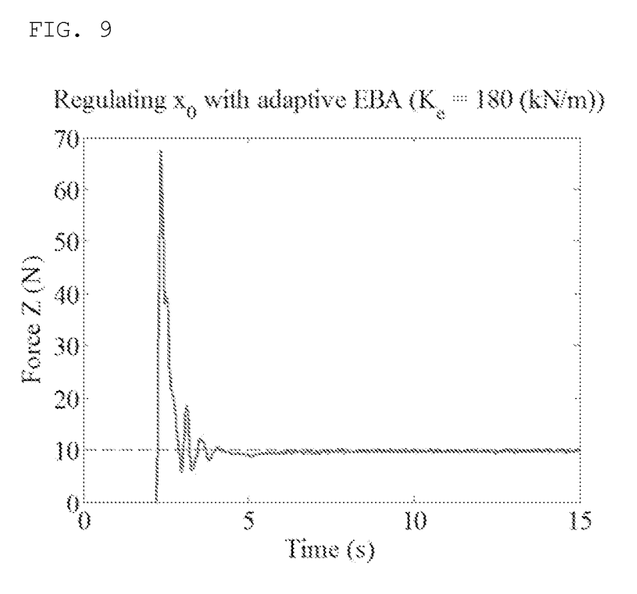
FIG. 9 is a graph showing a contact force of a position-based impedance controlled industrial robot), with a new reference position applied, in a stiff environment.

FIG. 7 is a graph showing a contact force of a position-based impedance controlled industrial robot 10 in a nominal environment, and FIG. 8 is a graph showing a contact force of a position-based impedance controlled industrial robot 10 in a stiff environment and FIG. 9 is a graph showing a contact force of a position-based impedance controlled industrial robot 10, with a new reference position applied, in a stiff environment.

In a nominal environment, contact force of a robot may be maintained at a designed value for both position based impedance control (PBIC) and adaptive EBA control such as the graph in FIG. 7.

In a stiff environment, an unstable contact is generated in the case of a position-based impedance control (PBIC) and a stable contact is generated in the case of an adaptive EBA control such as in FIG. 8. But, even in the case of an adaptive EBA control, when a first control parameter c1 is lesser than a stiffness value of an environment 20 ($.c_2 \le c_1 \le K_e$), a second control parameter c2 is bounded to a first control parameter c1, and therefore a greater contact force than a designed contact force is maintained.

To improve this performance degradation, a control unit 200 in the present invention, judges whether a bounding parameter value is over a satisfactory range of a passivity condition and is bounded in a maximum or a minimum value (EBA bounding generated), calculates a new reference position X0 in the case EBA bounding is generated and applies to a position controller 210.

That is, in the case of a stiff environment, when reference position X0 is decreased to obtain a desired contact force while maintaining contact stability guaranteed from an EBA, a contact result with improved performance such as in FIG. 9 may be obtained.

Figure 5:
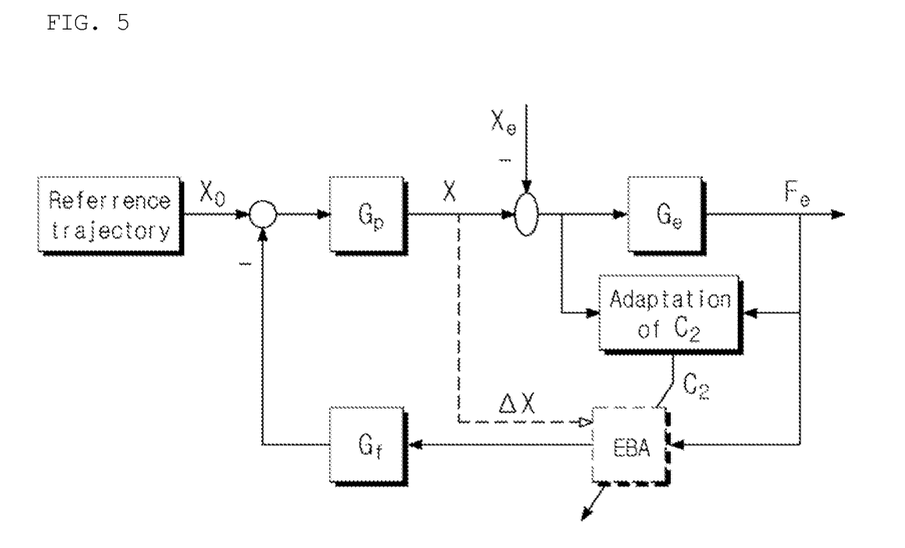
FIG. 5 is a block diagram of an overall system of FIG. 1.

FIG. 5 is a control block diagram of a position-based impedance controlled industrial robot 10 with the described adaptive EBA applied.

The adaptive EBA in FIG. 5 uses a force/torque sensor to estimate a stiffness of an environment 20 and applies as a second control parameter c2.

Figure 6:
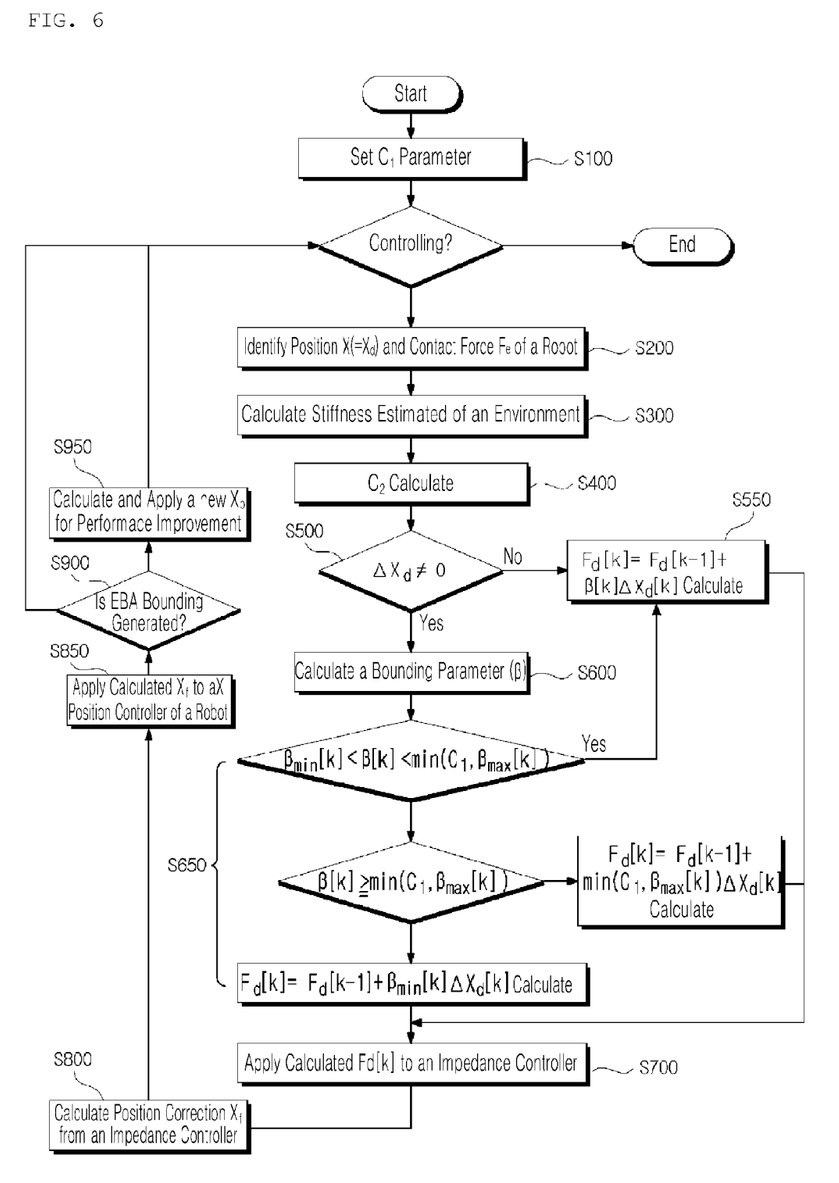
FIG. 6 is a flow chart of a position-based impedance controlled industrial robot according to an embodiment of the present invention.

FIG. 6 is a flow chart of a control method for a position-based impedance controlled industrial robot according to an embodiment of the present invention.

Referring to FIG. 6, a control method for a position-based impedance controlled industrial robot according to an embodiment of the present invention includes, (a) setting a first control parameter c1 S200; (b) detecting displacement (X=Xd) and contact force (Fe) of a robot S200; (c) calculating a stiffness estimate of an environment 20 from displacement (X=Xd) and contact force (Fe) of the robot S300; (d) calculating a second control parameter c2 from a first control parameter c1 and a stiffness estimate S400; (e) judging whether position variation is 0 S500; (f) calculating an operating force (Fd) of a robot if position variation is 0 S550; (g) calculating a bounding parameter if position variation is not 0 S600; (h) calculating a range of bounding parameter values satisfying a condition a robot system is passive using a first parameter c1 and a second parameter c2, and calculating operating force (Fd) of a robot according to a range of calculated bounding parameter values S650; (i) applying the calculated operating force (Fd) to an impedance controller 220 S700; (j) calculating a position correction displacement (Xf) by the impedance controller 220 S800; (k) applying position correction displacement (Xf) calculated from a position controller 210 S850; (l) judging whether a bounding parameter exceeds a range that satisfies a condition for passivity and is bounded to a maximum value or a minimum value (EBA bounding generated) S900; and (m) calculating a new reference position (X0) when EBA bounding is generated and applying it to a position controller 210 S950.

(a) S100 includes initializing a first control parameter c1 to a nominal environmental stiffness value; gradually increasing a first control parameter c1 when contact experiment with a high stiffness environment is performed and stable contact is maintained; gradually decreasing a first control parameter c1 when contact experiment with a high stiffness environment is performed and unstable contact is generated; and
setting a maximum value guaranteeing stability to a first control parameter c1.

In (d) S400, a second control parameter is calculated as a smaller value than a first control parameter and a stiffness estimate value (Equation 5).

An operating force (Fd) of a robot is calculated according to a control rule in equation 1, and a bounding parameter is calculated from equation 2.

(h) S650 modifies a bounding parameter to a maximum value when a bounding parameter is higher than a set maximum value, modifies a bounding parameter to a minimum value when a bounding parameter is lower than a set minimum value, and maintains the value of a bounding parameter when a bounding parameter is between a minimum and a maximum value.

The range of a bounding parameter is determined by the following bounding rule.

$$\beta_{max}[n]=\min(c_1,\gamma_{max}[n]), \beta_{min}[n]=\gamma_{min}[n] \text{ and,}$$

$$\gamma_{max}[n] = c_2 - \frac{F_d[n-1]}{\Delta x_d[n]} + \sqrt{c_2^2 + \left(\frac{F_d[n-1]}{\Delta x_d[n]}\right)^2}$$

Here, $\beta_{max}[n]$ is a maximum value of a bounding parameter, $\beta_{min}[n]$ is a minimum value of a bounding parameter, $F_d[n]$ is an operating force of a robot, $x_d[n]$ is a displacement of a robot, c1 is a first control parameter, c2 is a second control parameter, c1 and c2 are positive values and $c1 \ge c2$.

Thus, according to a control method and device for position-based impedance controlled industrial robot according to the present invention, a robust contact stabilization for a position-based impedance controlled industrial robot 10 contacting and interacting with an uncertain actual environment 20 may be guaranteed.

Also, a deteriorated performance of a position-based impedance controlled industrial robot 10, in which stability is guaranteed, may be improved through a stabilize first and improve performance later strategy Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:
1. A control method for position-based impedance controlled industrial robot in accordance with a force control method for a robot system with a position controller comprising:
   (a) setting a first parameter;
   (b) detecting a displacement (X=Xd) and a contact force (Fe) of a robot;
   (c) calculating a stiffness estimate value of an environment from the displacement (X=Xd) and the contact force (Fe) of the robot;
   (d) calculating a second control parameter from the first control parameter and the stiffness estimate value;
   (e) judging whether a position variation amount is 0;
   (f) calculating an operating force (Fd) of a robot if a position variation amount is 0;
   (g) calculating a bounding parameter if a position variation amount is not 0;
   (h) calculating a range of bounding parameter values satisfying a condition a robot system is passive using the first parameter and the second parameter, and calculating an operating force (Fd) of a robot according to the calculated range of bounding parameter values;
   (i) applying the calculated operating force (Fd) in an impedance controller;
   (j) calculating a position correction displacement (Xf) by the impedance controller; and
   (k) applying the calculated position correction displacement (Xf) to the position controller.

2. The method according to claim 1, wherein (a) further comprises,
   initializing the first control parameter to a nominal environmental stiffness value;
   gradually increasing the first control parameter when a stable contact is maintained while a contact experiment with a high stiffness environment is performed;
   gradually decreasing the first control parameter when an unstable contact is generated while a contact experiment with a high stiffness environment is performed; and
   setting a maximum value, which guarantees stability, to the first control parameter.

3. The method according to claim 1, wherein (d) is where the second control parameter is calculated as a smaller value than the first control parameter and the stiffness estimate value.

4. The method according to claim 1, wherein the operating force (Fd) of a robot is calculated with the following control rule:

$$F_d[n] = F_d[n-1] + \beta[n]\Delta x_d[n].$$

Here, $F_d[n]$ is an operating force of a robot, $\beta[n]$ is a bounding parameter, $x_d[n]$ is a displacement of a robot.

5. The method according to claim 1, wherein the bounding parameter is calculated with the following equation:

$$\beta[n] = \frac{F_e[n] - F_d[n-1]}{\Delta x_d[n]} \text{ for } \Delta x_d[n] \neq 0.$$

Here, $\beta[n]$ is a bounding parameter, $F_e[n]$ is an actual contact force of an environment measured from a force/torque sensor, $F_d[n]$ is an operating force of a robot, $x_d[n]$ is a displacement of a robot.

6. The method according to claim 1, wherein (h) modifies the bounding parameter to the maximum value when the bounding parameter is higher than a set maximum value, modifies the bounding parameter to the minimum value when the bounding parameter is lower than a set minimum value, and maintaining the value of the bounding parameter when the bounding parameter is between the minimum and the maximum value.

7. The method according to claim 6, wherein the range of the bounding parameter is determined by the following bounding rule:

$$\beta_{max}[n] = \min(c_1, \gamma_{max}[n]), \beta_{min}[n] = \gamma_{min}[n]$$

and, $$\gamma_{max}[n] = c_2 - \frac{F_d[n-1]}{\Delta x_d[n]} + \sqrt{c_2^2 + \left(\frac{F_d[n-1]}{\Delta x_d[n]}\right)^2}$$

$$\gamma_{min}[n] = c_2 - \frac{F_d[n-1]}{\Delta x_d[n]} - \sqrt{c_2^2 + \left(\frac{F_d[n-1]}{\Delta x_d[n]}\right)^2}.$$

Here, $\beta_{max}[n]$ is a maximum value of a bounding parameter, $\beta_{min}[n]$ is a minimum value of a bounding parameter, $F_d[n]$ is an operating force of a robot, $x_d[n]$ is a displacement of a robot, $c_1$ is a first control parameter, $c_2$ is a second control parameter, $c_1$ and $c_2$ are positive values and $c_1 \geq c_2$.

8. The method according to claim 1, wherein a control method for position-based impedance controlled industrial robot further comprises,
   (l) judging whether the value of the bounding parameter exceeds a range satisfying a condition for passivity and is bounded to a maximum value or a minimum value (EBA bounding generated); and
   (m) calculating a new reference position (X0) when EBA bounding is generated and applying to the position controller.

9. A control device for position-based impedance controlled industrial robot comprising:
   a sample/hold unit for performing input and output with a position-based impedance controlled industrial robot, and interconverting analog signals and digital signals; and
   a control unit receiving a physical parameter of the position-based impedance controlled industrial robot from the sample/hold unit, and calculating an operating force, which is to be transmitted to the position-based impedance controlled industrial robot, according to an interaction between the position-based impedance controlled industrial robot and an environment, and transmitting to the position-based impedance controlled industrial robot through the sample/hold unit.
   The control unit calculates a bounding parameter for the position-based impedance controlled industrial robot according to the physical parameter, and calculates an operating force of the position-based impedance controlled industrial robot according to a range of a bounding parameter value, in which a robot system satisfies a passivity condition in the environment, and applies to an impedance controller, and applies the calculated position compensation displacement, which is calculated by the impedance controller, to a position controller.

10. The device according to claim 9, wherein the operating force (Fd) of a robot is calculated with the following control rule:

$$F_d[n] = F_d[n-1] + \beta[n]\Delta x_d[n].$$

Here, $F_d[n]$ is an operating force of a robot, $\beta[n]$ is a bounding parameter, $x_d[n]$ is a displacement of a robot.

11. The device according to claim 9, wherein the bounding parameter is calculated with the following equation:

$$\beta[n] = \frac{F_e[n] - F_d[n-1]}{\Delta x_d[n]} \text{ for } \Delta x_d[n] \neq 0.$$

Here, $\beta[n]$ is a bounding parameter, $F_e[n]$ is an actual contact force of an environment measured from a force/torque sensor, $F_d[n]$ is an operating force of a robot, $x_d[n]$ is a displacement of a robot.

12. The device according to claim 9, wherein the control unit modifies the bounding parameter to the maximum value when the bounding parameter is higher than a set maximum value, modifies the bounding parameter to the minimum value when the bounding parameter is lower than a set minimum value, and maintaining the value of the bounding parameter when the bounding parameter is between the minimum and the maximum value.

13. The device according to claim 6, wherein the range of the bounding parameter is determined by the following bounding rule:

$$\beta_{max}[n] = \min(c_1, \gamma_{max}[n]), \beta_{min}[n] = \gamma_{min}[n],$$

and, $$\gamma_{max}[n] = c_2 - \frac{F_d[n-1]}{\Delta x_d[n]} + \sqrt{c_2^2 + \left(\frac{F_d[n-1]}{\Delta x_d[n]}\right)^2}$$

$$\gamma_{min}[n] = c_2 - \frac{F_d[n-1]}{\Delta x_d[n]} - \sqrt{c_2^2 + \left(\frac{F_d[n-1]}{\Delta x_d[n]}\right)^2}.$$

Here, $\beta max[n]$ is a maximum value of a bounding parameter, $\beta min[n]$ is a minimum value of a bounding parameter, $F_d[n]$ is an operating force of a robot, $x_d[n]$ is a displacement of a robot, c1 is a first control parameter, c2 is a second control parameter, c1 and c2 are positive values and c1≥c2.

14. The device according to claim 9, wherein the control unit judges whether the bounding parameter value exceeds a range satisfying a condition for passivity and is bounded to a maximum value or a minimum value (EBA bounding generated), and calculates a new reference position (X0) when EBA bounding is generated and applies to the position controller.

* * * * *